Reissued Sept. 21, 1926.

Re. 16,427

UNITED STATES PATENT OFFICE.

HEINRICH FRIEDRICH RAEDER AND WALTER MIEG, OF VOHWINKEL, GERMANY, ASSIGNORS, BY MESNE ASSIGNMENTS, TO GRASSELLI DYESTUFF CORPORATION, OF NEW YORK, N. Y., A CORPORATION OF DELAWARE.

DYESTUFF.

No Drawing. Original No. 1,508,409, dated September 16, 1924, Serial No. 642,102, filed May 28, 1923. Application for reissue filed July 12, 1926. Serial No. 122,035.

We have found that new and valuable dyestuffs can be obtained by treating aminodianthraquinonylamines with sulfonating agents.

The new dyes are after being dried and pulverized dark powders soluble in water generally with a violet to blue to green coloration. They are almost insoluble in dilute acids and dye wool from acid baths from violet to greyish-blue to bluish-green shades fast to light.

In order to illustrate our new process more fully, the following example is given, the parts being by weight:—

25 parts of 4.4′-diamino-1.1′-dianthraquinonylamine are dissolved in 250 parts of fuming sulfuric acid (30 per cent $SO_3$) while stirring and the resulting mixture is heated up to 100° C. until the sulfonic acid will be produced which is soluble in water with a blue coloration. After cooling the melt is poured into 2,000–2,500 parts of water, boiled up, filtered while hot and washed with a small quantity of water.

It is a dark powder scarcely soluble in cold, more easily soluble in hot water with a greenish blue coloration, it is soluble in concentrated sulfuric acid with a bluish-green and in boiling glacial acetic acid with a pure blue coloration. It dyes wool bluish-grey shades fast to light and fulling.

The diamino-alpha-beta-dianthraquinonylamine gives a blue-black dye, the 4.4′-dimethylamino-alpha-alphadianthraquinonylamine (obtained from the dinitro compound and monomethylamine) gives a greyish-blue dye.

We claim:

1. The herein-described new dyestuffs being sulfonic acids of aminodianthraquinonylamines, being after being dried and pulverized dark powders soluble in water generally with a violet to blue to green coloration; being almost insoluble in dilute acids and dyeing wool from acid baths from violet to greyish-blue to bluish-green shades fast to light, substantially as described.

2. The herein-described new dye being a sulfonic acid of 4.4′-diamino-1.1′dianthraquinonylamine, which is after being dried and pulverized a dark powder being scarcely soluble in cold and more easily soluble in hot water, being soluble in concentrated sulfuric acid with a bluish-green and in boiling glacial acetic acid with a pure blue coloration; dyeing wool from acid baths bluish-grey shades fast to light and to fulling, substantially as described.

HEINRICH FRIEDRICH RAEDER.
WALTER MIEG.